United States Patent [19]

Dyer

[11] Patent Number: 4,585,986
[45] Date of Patent: Apr. 29, 1986

[54] DC SWITCHING REGULATED POWER SUPPLY FOR DRIVING AN INDUCTIVE LOAD

[75] Inventor: George R. Dyer, Norris, Tenn.

[73] Assignee: The United States of America as represented by the Department of Energy, Washington, D.C.

[21] Appl. No.: 555,915

[22] Filed: Nov. 29, 1983

[51] Int. Cl.$^4$ ............................................. G05F 1/563
[52] U.S. Cl. ................................... 323/271; 323/282; 363/17; 363/98; 363/124; 363/132
[58] Field of Search ............... 323/271, 282, 284, 225, 323/350, 351; 363/16, 20, 21, 41, 78, 124, 131, 132, 17, 98

[56] References Cited

U.S. PATENT DOCUMENTS

| | | | |
|---|---|---|---|
| 3,559,028 | 1/1971 | Studtmann et al. | 363/16 |
| 3,614,590 | 10/1971 | Kernick | 363/71 |
| 3,710,229 | 1/1973 | Jessee | 363/41 |
| 4,095,166 | 6/1978 | Shibata et al. | 323/271 |
| 4,241,395 | 12/1980 | Stacey et al. | 363/20 |
| 4,395,675 | 7/1983 | Toumani | 323/271 |
| 4,403,269 | 9/1983 | Carroll | 363/132 |
| 4,408,268 | 10/1983 | Peters et al. | 363/124 |
| 4,424,557 | 1/1984 | Steigerwald | 363/98 |
| 4,484,257 | 11/1984 | Sugimoto | 363/124 |

FOREIGN PATENT DOCUMENTS

| | | | |
|---|---|---|---|
| 2445093 | 4/1976 | Fed. Rep. of Germany | 363/16 |
| 3004000 | 8/1981 | Fed. Rep. of Germany | 363/20 |

*Primary Examiner*—Patrick R. Salce
*Assistant Examiner*—Jeffrey Sterrett
*Attorney, Agent, or Firm*—David E. Breeden; Stephen D. Hamel; Judson R. Hightower

[57] ABSTRACT

A power supply for driving an inductive load current from a dc power supply through a regulator circuit including a bridge arrangement of diodes and switching transistors controlled by a servo controller which regulates switching in response to the load current to maintain a selected load current. First and second opposite legs of the bridge are formed by first and second parallel-connected transistor arrays, respectively, while the third and fourth legs of the bridge are formed by appropriately connected first and second parallel connected diode arrays, respectively. The regulator may be operated in three "stages" or modes: (1) For current runup in the load, both first and second transistor switch arrays are turned "on" and current is supplied to the load through both transistor arrays. (2) When load current reaches the desired level, the first switch is turned "off", and load current "flywheels" through the second switch array and the fourth leg diode array connecting the second switch array in series with the load. Current is maintained by alternating between modes 1 and 2 at a suitable duty cycle and switching rate set by the controller. (3) Rapid current rundown is accomplished by turning both switch arrays "off", allowing load current to be dumped back into the source through the third and fourth diode arrays connecting the source in series opposition with the load to recover energy from the inductive load. The three operating states are controlled automatically by the controller.

5 Claims, 3 Drawing Figures

DC SWITCHING REGULATED POWER SUPPLY FOR DRIVING AN INDUCTIVE LOAD

This invention is a result of a contract with the U. S. Department of Energy.

BACKGROUND OF THE INVENTION

This invention relates generally to the art of automatic regulation of dc power supplies and, more specifically, to automatic switching regulated power supplies.

In the art of automatic regulation of dc power to a load, it has been the practice to use either a continuous analog control method or a switching control method, referred to as a "chopper." The continuous analog control method is referred to as a dissipative type controller in that the difference between the source power and the instantaneous load power requirement must be dissipated in the regulating device, such as a series transistor regulator. Therefore, in order to minimize power dissipation in the regulating device, especially for rather high power requirements, it has been the practice to use a switching regulator in which the average power supplied from a dc source to a dc load is regulated by a series switch that repetitively opens and closes thereby "chopping" the current which flows between the two. Control is achieved by varying the relative on time or duty cycle. In automatic regulation the duty cycle is determined by a circuit which compares the load voltage to a reference voltage.

When using a transistor as the switching element in a switching regulator, the transistor is operated at or near saturation, where its dissipation is minimized. Thus, in high power applications, requiring a number of regulating elements in a parallel array to handle the high currents, it is desirable to use the switching or chopper method in order to reduce the number of switching elements required due to the reduced switching element dissipation. However, when a switching regulator is used to regulate dc power to an inductive load, some means must be provided for absorbing the energy stored in the inductance when the circuit is interrupted, otherwise the inductive voltage spikes may destroy the switching elements. This may be accomplished by connecting a freewheeling diode in parallel with the load so that the stored energy is dissipated in the load itself.

A regulator of this type may be used successfully to regulate the current to an inductive load as long as the current is to be at a fairly constant level. However, in many applications it is desirable to regulate large fluctuations in load current in an inductive load very quickly wherein the load dissipation rate is very low. One example is the vertical field winding of a tokamak fusion reactor which is used to position the plasma within the plasma chamber. These windings are highly inductive with very little resistance for power dissipation. Another example is an electric motor driven vehicle where it is not only desirable to regulate fast changes in current applied to the motor but to return energy to the power supply during rundown or regenerative braking while minimizing power dissipation in the regulating device and providing smooth current regulation during all phases of operation of the vehicle. The conventional switching regulated power supplies do not provide this type of control. Thus, there is a need for an automatic switching regulator for inductive loads which takes advantage of the desirable low dissipation in the control element while allowing fast current changes, both runup and rundown, and the added advantage of dumping energy from the load back into the source during current rundown.

SUMMARY OF THE INVENTION

In view of the above need, it is an object of this invention to provide an improved switching regulator for regulating dc power to an inductive load.

Further, it is an object of this invention to provide a switching regulator for regulating dc power to an inductive load with the added advantage of energy recovery by dumping current back into the source during load current rundown.

Other objects and many of the attendant advantages of the present invention will be obvious to those skilled in the art from the following detailed description of a preferred embodiment of the invention taken in conjunction with the drawings.

In summary, the basic switching circuit of this invention is a bridge arrangement in which switching transistors are connected to form first and second switching legs of the bridge between corresponding polarity input and output terminals of the bridge and diodes are connected to form third and fourth legs of the bridge between noncorresponding input and output terminals. The output terminals of the bridge are connected to an inductive load to be regulated and a dc power source. The transistor switches are arranged to provide current conduction from one terminal of the source through the first leg of the bridge to the load and back through the second leg of the bridge to the other source terminal so that both must be switched "on" to apply current from the source to the load. The diodes are connected so that when one of the switching legs is switched "off", at the point when the desired load current is reached, the current continues to flow through the switching leg that is "on", one diode leg and the load. Current is maintained in the load by switching between the full on state, both switch legs "on", and the one switch leg "on", state where no current is drawn from the source. Rapid current rundown in the load is accomplished by turning "off" both switch legs, so that load current is dumped back into the source through the diode legs of the bridge.

A servo control means is provided which senses the difference between a reference voltage and a voltage across a shunt placed in series with the load, to control the switching of the transistors of the switching legs of the bridge to automatically perform the three switching modes of control.

DETAILED DESCRIPTION OF A PREFERRED EMBODIMENT

Figure 1:
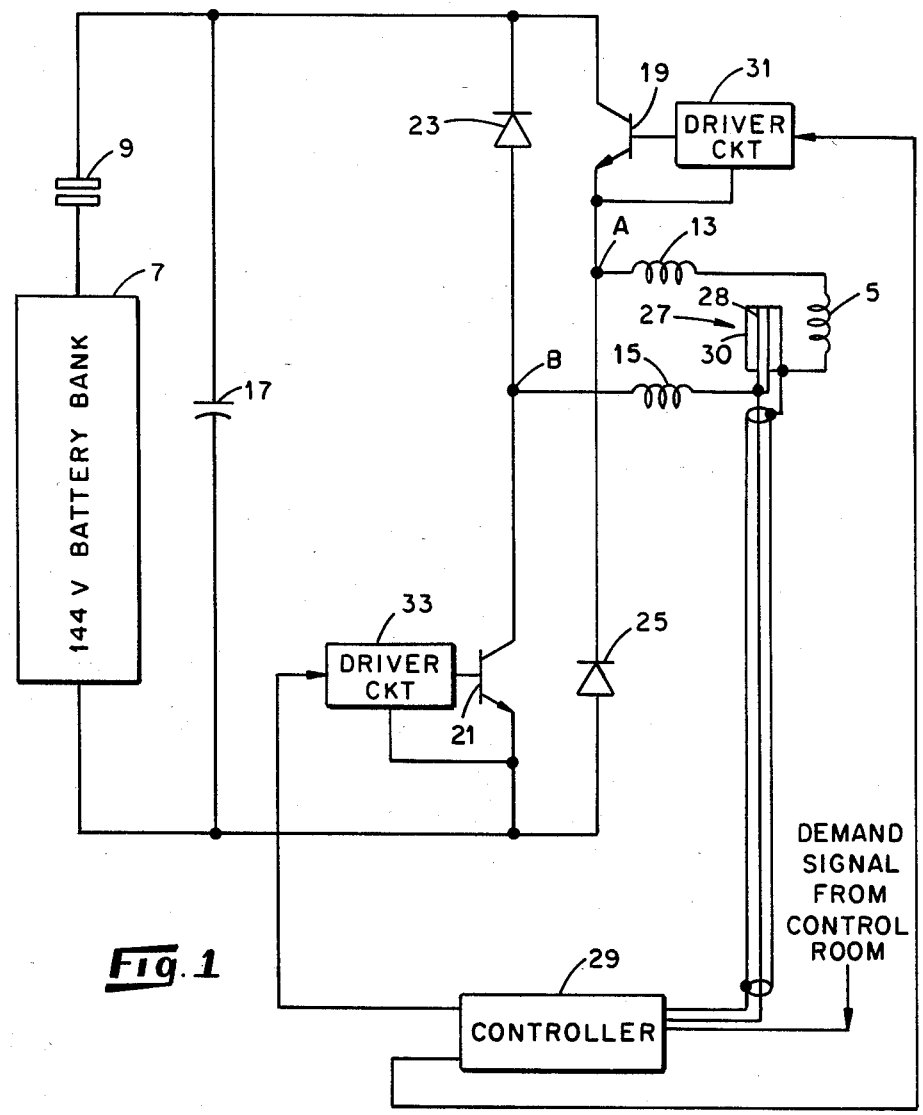
FIG. 1 is a schematic diagram of a dc switching regulated power supply for driving an inductive load according to the present invention.

Referring now to FIG. 1, a dc switching regulator according to the present invention is shown for controlling a highly inductive load such as the outer vertical field coil winding of an experimental tokamak fusion reactor, illustrated schematically by an inductor 5 connected to the output of the regulator. In this application, the maximum power to the winding is about 4.3 MW (30KA at 144 volts). A 144-volt battery bank 7 is used to supply power to the winding. The battery bank is connected through a main contactor 9 to the input terminals of a bridge connected switching arrangement 11. The bridge is connected at the output terminals A and B to the load device 5 through series inductors 13 and 15, respectively. The purpose of the inductors 13 and 15 is first, to provide a minimum inductance at the output of the power supply in case the load develops a short circuit; and second, to act as a low-pass filter, minimizing the transmission of electrical switching noise from the power supply. A capacitor bank 17 formed of a number of parallel-connected capacitors, due to the high currents to be controlled, is connected across the switching bridge circuit 11 in parallel with battery bank 7 to minimize the high-frequency impedance at the bridge input, and thus to prevent destructively high voltage transients across the bridge circuit.

The switching bridge circuit 11 includes two unidirectional current flow switching legs and two freewheeling diode legs. The first switching leg includes a transistor switching device 19 connected through the contactor 9 between the positive terminal of the battery bank 7 and the corresponding polarity output terminal A to conduct current from the positive side of the battery to the load. The second switch leg includes a transistor switching device 21 connected between the negative terminal of the battery bank 7 and the corresponding polarity output terminal B. The third leg of the bridge includes a diode device 23 connected between the source positive terminal and the non-corresponding output B of the bridge. Diode device 23 is connected with the cathode toward the positive side of the battery. The fourth leg of the bridge includes a diode device 25 connected between the negative side of the battery and the non-corresponding output terminal A of the bridge with the cathode toward output terminal A. Although the transistor switching devices and diode devices of the bridge 11 are shown schematically, for the purpose of simplifying the drawing, as single devices, it will be understood that for different applications, number of parallel connected transistors or diodes to handle the specific application load current. This varying number includes a single device for low current applications. For example, in an application for a tokamak winding, as illustrated herein, the transistors are NPN silicon power Darlington transistors, type MJ10100, which are available from Motorola Semiconductor Products, Inc., Phoenix, Ariz. These transistors are capable of dissipating about 500 watts each and conduct currents of about 100 amps each. Therefore, 300 transistors are connected in parallel for each of the switching legs to handle about 30 K Amps of maximum load current. The diodes used are fast-recovery silicon reactifiers, Catalog Number R7S20609HSOO, which are commercially available from Westinghouse Electric Corporation, Semiconductor Division, Youngwood, Pa. 15697. These diodes are capable of conducting about 1 KA each. Therefore, each diode leg is made up of 30 diodes in parallel.

In order to provide automatic control a current measuring device, in this case a co-axial shunt 27, is connected in series with the load to develop a voltage signal proportional to the load current. The shunt is formed by a co-axial current conducting device to minimize the generation of inductive voltages which swamps the shunt resistive voltage being measured due to the rapidly change high currents being switched. The shunt includes a central conductor such as a copper tube 28 and a slightly resistive outer concentric conductor such as a stainless steel sleeve 30 concentrically disposed about the tube 28. The sleeve is connected to the inner tube at one end so that the load current flows through the tube 28 from a series connection at the opposite end of the tube 28 and back through the outer tube 30 to the other series connection. The closely spaced, opposite direction current paths through the co-axial shunt cancels the inductive voltage component. The resistive voltage component is supplied by the resistive sleeve 30. A co-axial cable 32 is connected across the shunt to transmit the voltage signal to one input of a controller 29. This voltage is compared with a current demand signal reference voltage, which is fed from the reactor control room, in the comparator-type controller 29 which compares the shunt voltage with the reference demand voltage and generates separate control signals which are applied to driver circuits 31 and 33, respectively. The driver circuits 31 and 33 are connected to the base electrodes of switching transistor devices 19 and 21 so that the switches are turned "on" when a control signal is applied to the corresponding driver circuit by the controller. Each switching transistor is biased by its driver circuit to operate in the saturated region when turned "on" to minimize power dissipation in the switch.

Figure 2:
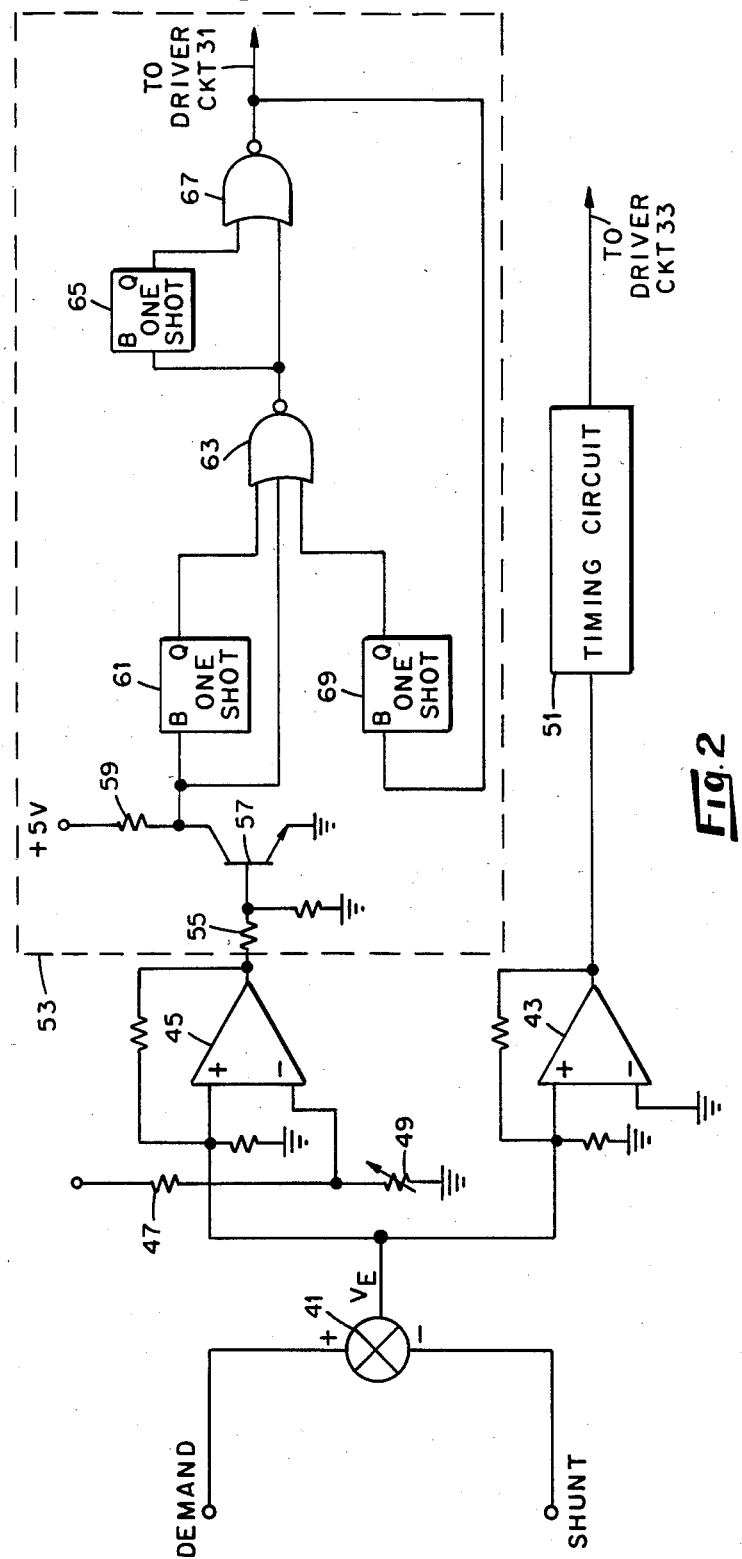
FIG. 2 is a schematic diagram of the servo control circuit shown in block form in FIG. 1.

Referring now to FIG. 2, the controller 29 will be described. The demand reference signal is applied to the positive terminal of a subtractor 41 and the shunt voltage signal from the shunt 27 is applied to the negative terminal of the subtractor 41. The output of the subtractor is an error signal $V_E$ proportional to the difference between the demand signal and the shunt voltage signal. This signal is applied to the non-inverting inputs (+) of a pair of comparator amplifiers 43 and 45. The inverting input (−) of the first level comparator 43 is connected to ground potential while the inverting input of the second level comparator amplifier 45 is connected to a voltage divider consisting of resistors 47 and 49 connected between a positive voltage source and ground potential. The resistor 49 may be a variable resistor so that the second level comparator reference may be selected for a particular application or operating mode.

The output of comparators 43 and 45 are connected to identical switching pulse timing circuits 51 and 53, respectively, which limit the switching rate and thus the duty cycle of the transistor switches to a selected minimum value determined by the timing circuits. This operation is necessary to prevent unwanted excessive switching due to noise in the circuit when the error signal is near one of the comparator levels.

Since the timing circuits are identical, only one circuit, circuit 53 connected to the output of comparator 45 will be described. The output of the comparator is connected through a resistor 55 to the base of a transistor 57. The emitter of transistor 57 is connected to ground and the collector is connected to a +5 V supply through a resistor 59 so that when the output of the comparator goes positive, due to $V_E$ exceeding the reference applied to the inverting input, transistor 57 is forward biased and is placed in the state of conduction. The collector of transistor 57 is connected to the B input of a 100 microsecond one-shot 61 and to one input of a NOR gate 63. The Q output of one-shot 61 is connected to another input of NOR gate 63. The output of NOR gate 63 is connected to the B input of a 25 microsecond one-shot 65 and one input of a NOR gate 67 which has a second input connected to the Q output of one-shot 65. To complete the circuit, the output of NOR gate 67 is connected to the B input of a 70 microsecond one-shot 69 and the Q output of one-shot 69 is connected to a third input of NOR gate 63.

The operation of the timing circuit is such that it prevents switching of the power supply at a rate faster than 10 kHz, as determined by the period of one-shot 61. The minimum "on" time is set at 25 microseconds as determined by the one-shot 65, and the minimum "off" time following a switching pulse is set at 70 microseconds as determined by the period of one-shot 69. Therefore, the duty cycle of the controller is limited by the output timing circuits.

During current runup in the load, the demand signal voltage to the input of the controller exceeds the shunt voltage to provide a positive error signal $V_E$. This causes the outputs of both of the comparators 43 and 45 to be "high" (positive output). The high condition turns the transistor 57 of the timing circuits "on" forcing a transition from a high (+5 V) at the collector of transistors 57 to a "low" (essentially ground) potential. This low condition to one input of NOR gate 63 with the other two inputs also low, causes the output to go from a low to a high. This forces the output of gate 67 low to trigger the corresponding driver circuit to switch the transistors of the bridge circuit (FIG. 1) on. When the error voltage $V_E$ goes below the reference voltage to the upper comparator 45, the output goes negative turning transistor 57 off. Therefore, the collector voltage goes high, triggering one-shot 61 which in turn causes the Q output to go high for 100 microseconds. This forces the output of gate 63 low which forces the output of gate 67 high to turn the switch 19 off. The transition from a low to a high at the output of gate 67 triggers one-shot 69, causing the Q output to go high for 70 micro-seconds. This inhibits NOR gate 63 for at least 70 microseconds following a switch turn off so that the switch cannot be turned on by the output of the comparator going high during that period. Further, each time the transistor 57 is turned off by the output of the comparator going negative, the low-to-high transition at the collector of transistor 57 triggers one-shot 61. This causes the Q output to go high for 100 microseconds which also inhibits gate 63 for that period. Also, to ensure that the switch remains on for at least 25 microseconds after being switched on by a high-to-low transition at the output of gate 67 to the the driver circuit, the one-shot 65 is triggered on when the output of gate 67 low for the 25 microsecond until one-shot 65 times out. Therefore, it will be seen that excessive switching of the bridge switches is prevented by the timing circuits and the maximum switching rate is limited to 10 kHz.

Figure 3:
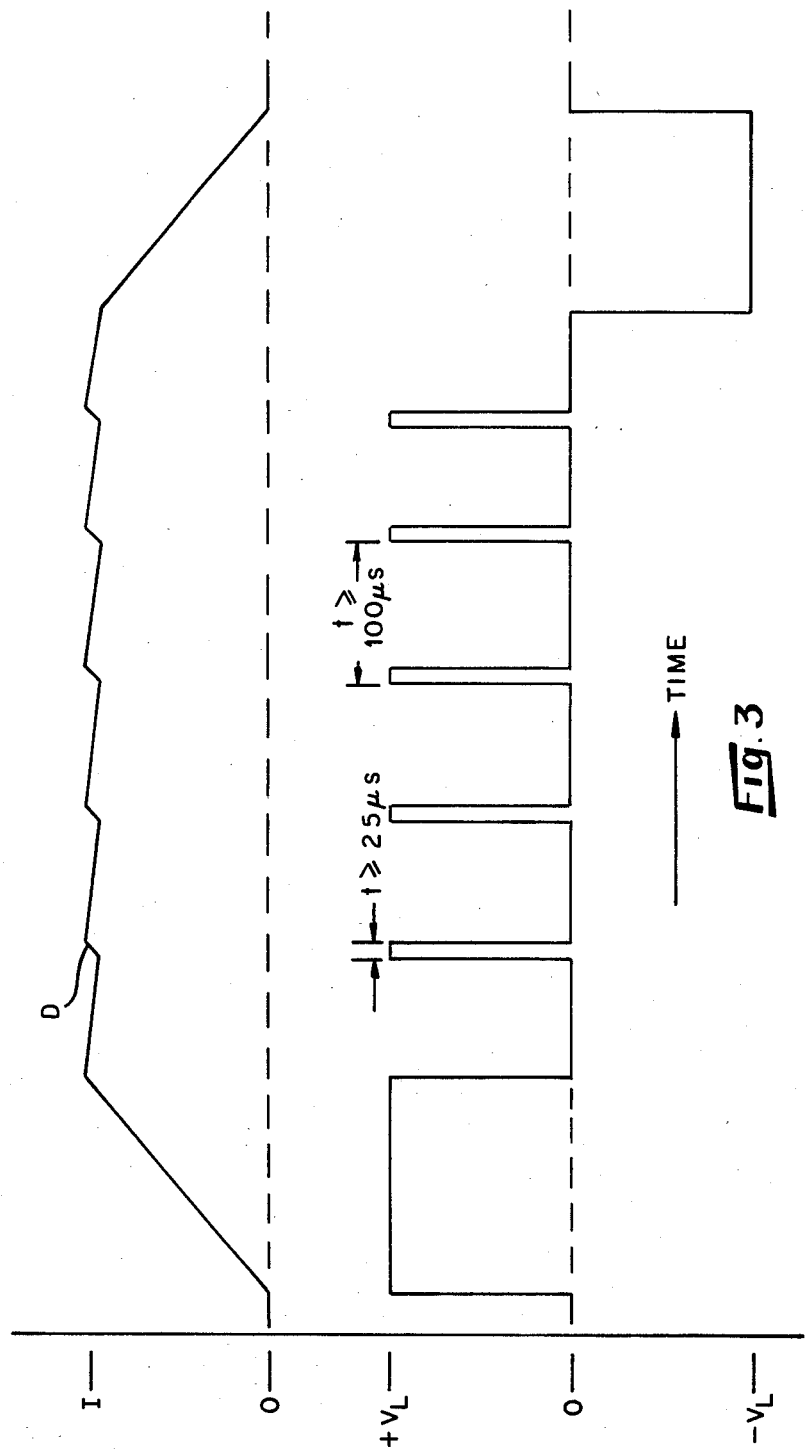
FIG. 3 is a graphic illustration of the controlled current in a tokamak winding shown in the upper portion of the graph in response to a square wave voltage pattern across the winding in the lower portion to produce the controlled current including the initial current runup in the load and subsequent current rundown which may be accomplished by the controller of FIG. 1.

Referring now to FIG. 3 in conjunction with the previously described FIGS. 1 and 2, the overall operation of the switching power supply will be described. The circuit is activated by closing the contacts of contactor 9, thereby applying the battery voltage (144 V) to the input of the bridge 11. The operator then selects the desired load current by adjusting an appropriately calibrated potentiometer or the like (not shown) to provide a demand reference voltage to the input of controller 29 which is proportional to the selected load current level. This causes both switching transistors 19 and 21 of the bridge 11 to be turned on applying full power to the load 5, as noted by the load voltage graph in FIG. 3. Both switches 19 and 21 remain on until the load current (I) builds, as shown in the top graph of FIG. 3, to a value slightly above the demand current level. At this point, the error voltage $V_E$ is reduced to a value corresponding to the reference voltage applied to comparator 45, causing the output of comparator 45 to go negative. This action turns switching transistor 19 "off", thereby removing the battery voltage from the load as indicated by the voltage curve $V_L$ in FIG. 3. However, the output of comparator 43 remains high which keeps the switching transistor 21 "on" and the inductive load current freewheels through diode 25 passing through the load 5 and switch 21. The load current decays until $V_E$ falls below the reference voltage applied to the input of comparator 45. At this point transistor switch 19 is turned "on" again for at least 25 microseconds causing the load to again build as shown at point D in the load current graph. The switching deadband, which is centered about the comparator 45 reference voltage level, is provided in a conventional manner by the switching hysteresis built into the comparator. The deadband is selected by the choice of resistance values in a positive feedback circuit loop. Typically, the deadband is about 2 volts. The switching action continues at a rate less than or equal to 10 KHz, as controlled by the timing circuit 53 to maintain the selected load current.

When the load current demand is decreased by the operator or the load current is to be shut off, the demand reference voltage to the controller 29 is decreased, thereby producing a negative error signal ($V_E$). When this happens the output of both comparators 43 and 45 switch to the negative state, thereby turning both switching transistors 19 and 21 "off". At this point both diodes 23 and 25 are connected in series with the load and the load current freewheels through these diodes and power is dumped back into the battery bank 7. This switching action connects the battery 7 in series opposition with the load and acts as a current sump during current rundown in the inductive load 5. When the load current decays to a value such that the error signal returns to a sufficiently positive value to switch the output state of both comparators 43 and 45 to the positive output state, the regulating switching action begins, as described above, to maintain the new lower current level. Likewise, a new increased current level may be achieved by increasing the demand reference voltage and the load current will build to the new demand level and the switching regulation again takes over to maintain the new increased demand current level.

Thus, it will be seen that there are three operating "states" or modes: (1) For current runup in the load, both bridge circuit transistor switch arrays 19 and 21 are turned "on", and the battery bank drives current through both arrays and the load. (2) When load current has reached the desired level, the upper switch array is turned "off", and load current freewheels through the switch array 21 (still "on") and the diode array 25. (Current is maintained by alternating between modes (1) and (2) at a suitable duty cycle and rate, set by the servo controller). (3) Rapid current rundown is accomplished by turning "off" both switch arrays, so that load current is dumped back into the battery bank through diode arrays 23 and 25. This operation recovers some of the energy from the inductive load circuit, since the reverse current charges the battery bank during this operation. The tri-state operation, accomplished automatically by the servo control system, contributes to smoothness of current control, minimizes electrical noise generated by the operating supply, and provides symmetrical response time for current runup and rundown in the load.

Successful operation for controlling currents in the kiloampere range at high switching speeds (the arrays switch states in approximately 5 microseconds) and fast cycle times (maximum switching rate is 10 kHz) depends critically on the physical arrangement of the complete circuit. The bussing arrangement must be designed to support and connect the circuit elements in such a way as to keep induced voltages within tolerable limits. This becomes a formidable design task when installing the switching regulator for controlling high load currents. The busses are physically arranged so that each bus closely parallels another bus to carry essentially equal currents in opposite directions in order to properly cancel induced voltages. Otherwise, these voltages would become so large that they would exceed the voltage rating of the solid state switching devices and diodes of the switching bridge arrangement, causing circuit failure.

Although the preferred embodiment of the invention has been described as applicable to a highly inductive winding of a tokamak fusion reactor, it will be obvious to those skilled in the art that the circuit will be applicable for controlling inductive load currents in various other systems.

Another use of a small-scale version of this supply is as a controller for an electric vehicle. The circuit is very efficient in transferring power from a battery to a motor since its switching operation wastes little power as heat. Further, it provides for "regenerative braking" through its energy recovery feature.

Another possible use of the invention is in geological experiments where pulses of 200–400 volts at currents of about 1000 A are required to generate electrical fields in geological formations.

These and other modifications and variations of this invention will become apparent to those skilled in the art from the foregoing detailed description of a preferred embodiment of the invention and the accompanying drawings. Such modifications and variations are intended to fall within the scope of the appended claims.

I claim:

1. A switching regulated DC power supply for regulating the direct current to an inductive load, comprising:
   a dc power source;
   an inductive load;
   a bridge circuit including first and second input terminals connected respectively to opposite polarity terminals of said power source, first and second output terminals of corresponding polarity to said first and second input terminals connected across said load, a first unidirectional current conducting switching means forming a first leg of said bridge circuit for conducting current from said first input terminal to said first output terminal in response to a first control signal applied to a control input thereof, a second unidirectional current conducting switching means forming a second leg of said bridge circuit for conducting current from said second output terminal to said second input terminal in response to a second control signal applied to a control input thereof, a first diode device connected between said first input terminal and said second output terminal to allow load current to flow therethrough when said second switching means is switched off and a second diode device connected between said second input terminal and said first output terminal to allow load current to flow therethrough when said first switching means is switched off so that when both of said first and second switching means are switched on current flows from said source to said load when said first and second switching means are switched off current flows from said load to said source;
   means for sensing the direct current flowing through said load and generating a load signal proportional thereto; and
   a servo control means responsive to the difference between said load signal and a demand reference signal proportional to a selected current level for generating and applying said first and second control signals to said first and second switching means, respectively, to switch said first and second switching means on allowing current to be supplied to said load until said load signal is substantially equal to said demand reference signal, to switch said first switching means on and off at a selected rate to maintain said load current at said selected level and switching said first and second switching means off to reduce the current level to said load when said demand reference signal is substantially less than said load signal allowing power to flow from said load into said source until said load signal is substantially equal to said demand reference signal.

2. The device as set forth in claim 1 wherein each of said first and second unidirectional switching means includes at least one switching transistor and a driver circuit connected to said transistor for switching said transistor on when a corresponding one of said first and second control signals is applied to an input thereof.

3. The device as set forth in claim 2 wherein said load current is in the kiloamperes range.

4. The device as set forth in claim 1 wherein said servo control means includes a subtractor circuit means responsive to said load signal and said demand reference signal for generating an error signal having a magnitude indicative of the difference between said demand reference signal and said load signal, a first comparator means for comparing said error signal with a lower reference level and generating said second control signal when said error signal exceeds said lower reference level and a second comparator means for comparing said error signal with and upper reference level and generating said first control signal when said error signal exceeds said upper reference level.

5. The device as set forth in claim 4 further comprising first and second timing circuit means connected in series with the outputs of said first and second comparator means, respectively, for limiting the duty cycle of said first and second control signals, respectively.

* * * * *